United States Patent [19]
Wehrman et al.

[11] Patent Number: 5,555,749
[45] Date of Patent: Sep. 17, 1996

[54] USE OF CENTRIFUGAL COMPRESSORS IN ADSORPTIVE SYSTEMS

[75] Inventors: Joseph G. Wehrman, Macungie, Pa.; Stephen J. King, Farnham; Kulwant S. Birdi, Harrow, both of England

[73] Assignee: Air Products and Chemicals, Inc., Allentown, Pa.

[21] Appl. No.: 431,693

[22] Filed: Apr. 28, 1995

[51] Int. Cl.⁶ .................................................. F25J 3/00
[52] U.S. Cl. ................................................. 62/641; 62/908
[58] Field of Search ................................................. 62/18

[56] References Cited

U.S. PATENT DOCUMENTS

| | | | |
|---|---|---|---|
| Re. 34,434 | 11/1993 | Campbell et al. | 96/110 |
| 4,197,096 | 4/1980 | Sebastian et al. | 55/163 |
| 4,417,452 | 11/1983 | Ruminsky et al. | |
| 4,561,865 | 12/1985 | McCombs et al. | |
| 4,646,534 | 3/1987 | Russell. | |
| 4,686,834 | 8/1987 | Haley et al. | |
| 4,893,479 | 1/1990 | Gillett et al. | |
| 5,123,080 | 1/1992 | Gillett et al. | |
| 5,203,889 | 4/1993 | Brown | 55/163 |
| 5,214,367 | 5/1993 | Uesugi. | |

FOREIGN PATENT DOCUMENTS

WO94/01041  1/1994  WIPO.

*Primary Examiner*—Christopher Kilner
*Attorney, Agent, or Firm*—Willard Jones, II

[57] ABSTRACT

Method and apparatus for using a centrifugal compressor during the exhaust portion of the cycle in a pressure vessel used to separate components from a gaseous mixture by pressure swing or vacuum swing adsorption. Energy input to the motor of an electrically driven motor-compressor is minimized at a time when the exhaust portion of the cycle is initiated allowing rotation of the compressor wheel to decelerate by contact with the absorbed gaseous components until the speed of rotation of the compressor wheel matches the efficient compression ratio for the compressor and then reenergizing the motor to increase the speed of rotation of the compressor wheel according to the best efficiency curve for said compressor until a full outlet to inlet pressure ratio across said compressor is achieved.

10 Claims, 3 Drawing Sheets

5,555,749

USE OF CENTRIFUGAL COMPRESSORS IN ADSORPTIVE SYSTEMS

TECHNICAL FIELD OF THE INVENTION

The present invention relates to centrifugal compressors and the use of a centrifugal compressor as a means to exhaust a pressure vessel.

BACKGROUND OF THE INVENTION

The use of adsorptive processes in industry to separate various components from a gaseous mixture, e.g., oxygen from air is well known. Two major processes are currently in use. These are pressure swing adsorption (PSA) and vacuum swing adsorption (VSA). Pressure swing adsorption is carried out with the adsorption (feed) step at pressures much higher than ambient and adsorbent at pressures closer to an ambient. PSA processes are prone to high energy consumption when used to separate oxygen from air because the oxygen recovery is low and the entire feed train has to be compressed up to the adsorption pressure. The inefficiencies of the PSA process are somewhat minimized or circumvented by using vacuum swing adsorption. In the vacuum swing adsorption (VSA) processes, adsorption is carried at a pressure close to ambient and the adsorbent rate regeneration is carried out at sub-atmospheric pressure levels. The adsorbent beds go through several secondary steps with the primary aim of increasing oxygen recovery and reducing adsorbent inventory per unit of product gas.

A U.S. Pat. No. 4,561,865 illustrates a prior art pressure swing adsorption process.

Conventional PSA and VSA processes employ positive displacement compressors and blowers for either fluid compression or exhaustion in the adsorbent vessel. The conventional machines typically have lower efficiencies and higher maintenance costs than centrifugal compressors which are known in the art. In the past, attempts to utilize centrifugal compressors for PSA and VSA units have relied upon fixed speed centrifugal compressors with or without inlet guide vanes. However, centrifugal compressors operating at fixed speeds inherently have lower efficiencies at the lower pressure ratios when the pressure ratios change in a dramatic or dynamic fashion.

Positive displacement blowers currently used in, PSA and VSA systems exhibit three major drawbacks. First, positive displacement blowers show low efficiency in comparison to a centrifugal compressor at a single design point, with the difference in efficiency being as great as 15% in some cases. Positive displacement blowers tend to have problems including pressure pulsations, high sound level, and are prone to mechanical failures. Lastly, for large pressure ratios between the outlet and the inlet of the positive displacement blowers, two positive displacement blowers are needed in series with water injection into the gas in the positive displacement blowers for internal sealing and cooling of the blowers. The use of water injection adds to the overall cost of the system because of the cost of the water and the need to separate the water from the exhaust of the positive displacement blower.

The single largest problem with using a centrifugal compressor is the difficulty in reducing the pressure ratio in an efficient manner. The savings and efficiency in a VSA at full vacuum are lost during the times of low vacuum when a centrifugal compressor is employed. It has been proposed to increase the high efficiency range of a centrifugal compressor by installing guide vanes on the inlet compressor to act as a pre-whirl device to extend the range of vacuum level to where the centrifugal compressor is efficient. This device improves the efficiency to some degree, but not enough at the low pressure ratio part of the cycle. This device acts as an efficient device for flow decreasing, but not for lowering the pressure ratio. Such a technique is employed in the refrigeration industry as disclosed in U.S. Pat. Nos. 4,646,534 and 4,686,834, as well as in other process industries like air separation.

Variable speed driving (VSD) centrifugal compressors have been used in the past, however, usually in a slow changing environment such as temperature control. Variable speed driven compressors for refrigeration are shown in U.S. Pat. Nos. 4,417,452, 4,893,479, 5,123,080, and 5,214,367 which disclose various methods of variable frequency driving a compressor. Published International application PCT/US 94/01041 also discloses a variable speed motor for use with a compressor.

SUMMARY OF THE INVENTION

A motor driven centrifugal compressor with a variable frequency drive unit can be employed to compress and/or exhaust gas in a vacuum swing (VSA) or pressure swing adsorption (PSA) system. The variable frequency drive (VFD) must be designed to track the compressor speed or follow the compressor speed down as it decelerates while minimizing energy (current) input to the motor. PSA and VSA cycles switch from very high pressure ratios (outlet to inlet pressure of the compressor) to very low pressure ratios in a short time interval. When the cycle requires full pressure ratio, the speed of the motor/compressor is maximized through use of a variable frequency drive unit. When the cycle requires low pressure ratios, the speed of the motor compressor is minimized by adjustment of the VFD output to a low frequency. Changing from maximum speed to minimum speed in a short time frame is achieved by lowering the energy available to the motor from the variable frequency drive to a low value or zero thus permitting the process gases to act as a brake for the rotating parts of the motor/compressor. Increasing speed can be done using the standard variable frequency drive controls.

DETAILED DESCRIPTION OF THE INVENTION

Figure 1:
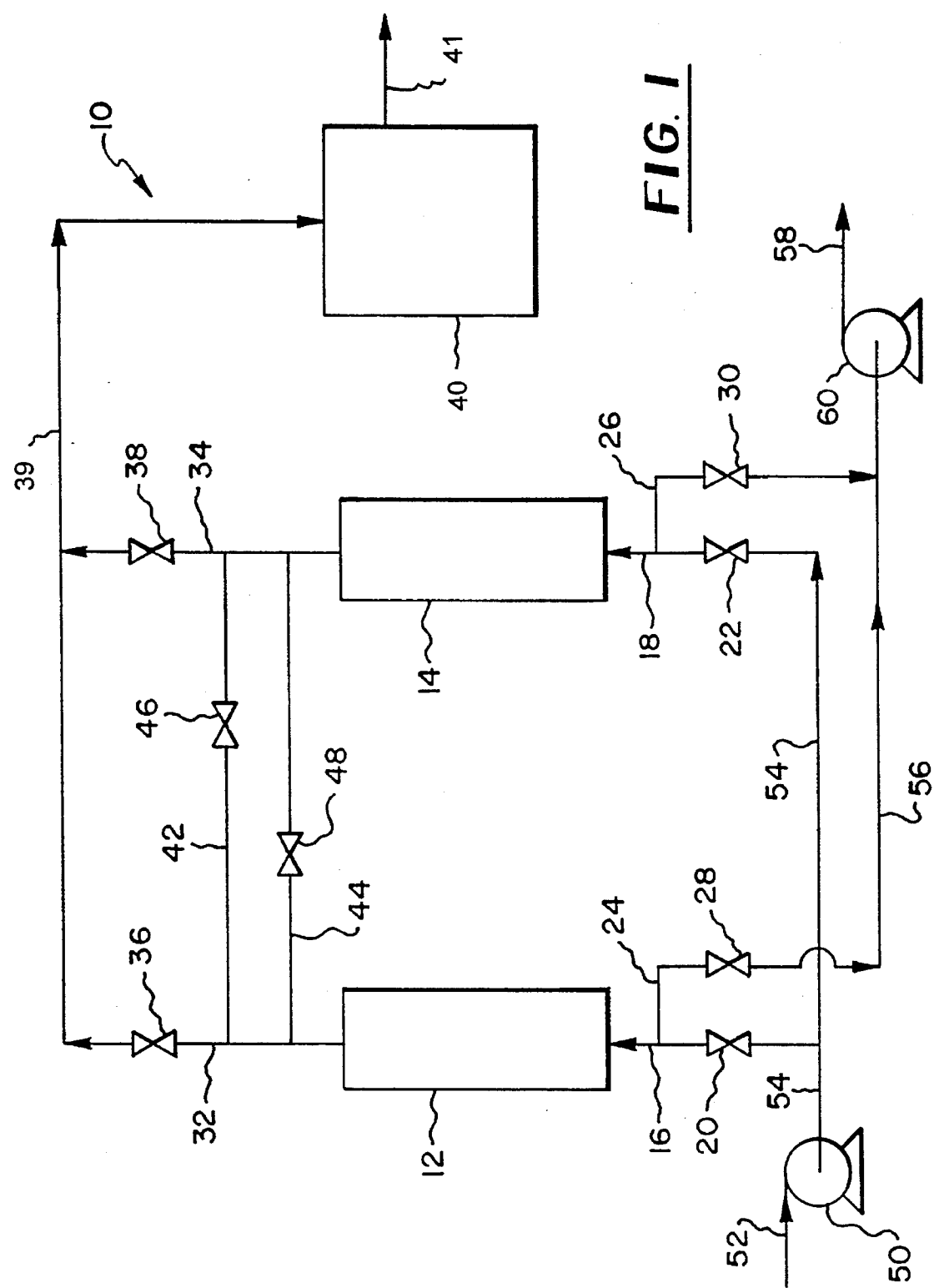
FIG. 1 is a schematic diagram of a typical VSA system utilizing dual adsorption beds.

FIG. 1 illustrates the invention applied to a vacuum adsorption (VSA) system. In the system 10 of FIG. 1, 12 and 14 represent dual adsorption beds which are well known in the art. Adsorption beds 12 and 14 have gaseous inlet conduits 16 and 18, respectively with inlet control valves 20, 22 to control inlet feed (e.g. air) to the beds 12 and 14 respectively. Beds 12 and 14 can be exhausted via outlet conduits 24, 26 which are controlled by exhaust valves 28 and 30 respectively. Product outlet conduits 32, 34 are controlled via product outlet valves 36, 38 respectively so that the product, (e.g. oxygen) can be conducted via conduit 39 to a storage receptacle or further processing vessel 40 from which an ultimate product stream 41 can be obtained. Between conduits 32, 34 are pressure equalization conduits 42, 44 with associated control valves 46, 48 respectively the function of which are known to a worker skilled in the art and need not be further explained herein.

An inlet compressor 50 is used to take an inlet gas stream, e.g. air, via conduit 52 and pressurize the feed stream for introduction into the beds 12 and 14 via main conduit 54 and inlet conduits 16 and 18 which are controlled by valves 20 and 22 respectively.

According to the invention, a centrifugal compressor 60 is used to exhaust beds 12 and 14 through main exhaust conduit 56 and branch exhaust conduits 24, 26 which are controlled by exhaust valves 28, 30 respectively. Exhaust from the beds 12 and 14 can be conducted via conduit 58 to atmosphere or further processing vessels (not shown) as is well known in the art.

Compressor 60 in accordance with the present invention, is an electrically motor driven centrifugal compressor with a variable frequency drive unit disposed between the motor and the source of energy. The variable frequency drive (VFD) unit must be constructed to track the compressor speed as the compressor wheel decelerates as will hereinafter be more fully explained.

In the system of FIG. 1, a gas mixture, (e.g. air) from which a component (e.g. oxygen in the case of air) is to be separated is introduced into inlet compressor 50 through conduit 52 at ambient pressure (14.7 psia). The process gas is raised to a pressure of approximately 20 psia and conveyed to a first adsorption bed 12 via conduit 54 and valve 20 and conduit 16. At this point in the cycle, valves 28, 22, and 30 are normally closed. In a continuous operation bed 14 is being evacuated via conduits 18, 26, and valve 30 to conduit 56 and exhaust compressor 60. Exhaust compressor 60 provides an outlet stream in conduit 58 at about 1 atmosphere (14.7 psia).

In the case of an air separation system, air introduced into the first adsorption bed contained in vessel 12 results in nitrogen being absorbed into the bed and oxygen being delivered as a product gas in conduit 32.

As the bed in vessel 12 nears the point where it will become saturated with nitrogen and must be desorbed, compressor 60 is operating at a very high pressure ratio (outlet to inlet pressure) as will hereinafter be explained. As is well known in the art, just prior to maximum saturation of bed 12, inlet valve 20 is closed and inlet valve 22 opens. Simultaneously, exhausts value 30 closes and exhaust valve 28 opens so that bed 14 can begin to separate oxygen from the air and bed 12 can be desorbed of nitrogen by evacuation. Simultaneously, with the switching of valves 20, 22, 28 and 30, energy to the motor for compressor 60 is minimized. This can be accomplished by the variable frequency drive either minimizing the energy input or terminating energy input altogether to the motor. By minimizing energy input to the motor that drives the compressor wheel, the speed of the compressor wheel can be changed from maximum which is required at full pressure ratio to minimum in a short time frame by lowering the energy available to the drive motor and letting the gaseous stream being exhausted from the bed act as a brake for the rotating parts of the motor/compressor.

At the instant in time just prior to when the valves switch, the compressor 60 has a high pressure ratio due to the vessel vacuum level needed for desorbing the nitrogen and the atmospheric outlet pressure. At this time, the compressor speed is maximized.

At the instant in time just after when the valves switch, the compressor has a low pressure ratio as the other vessel 12, was in the adsorbing mode, at about 20 psia. At about the same time as the valves switch, the VFD changes mode from a current/energy/frequency source to a minimal or no current/energy source. By minimizing energy from the VFD, the compressor/motor will decelerate quickly to a lower speed. The exhausting gas from vessel 14 is used as a brake to slow the compressor. When the speed of the compressor matches the pressure ratio at its most efficient point, the VFD is "re-started" to provide energy/current.

Figure 2:
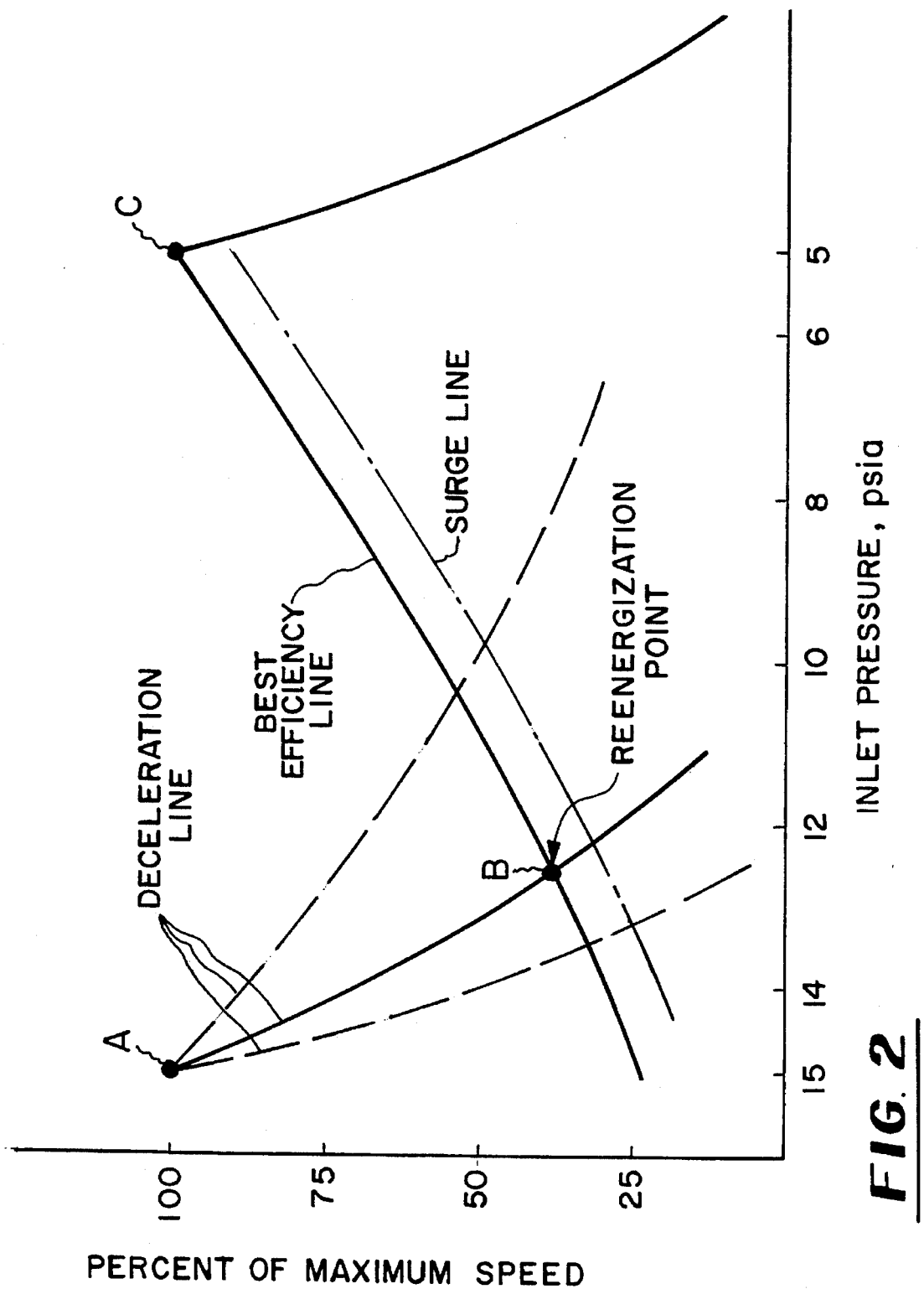
FIG. 2 is a plot of percent of maximum speed of rotation of the compressor wheel plotted against inlet pressure used to illustrate the method and apparatus of the invention.

The deceleration line is dependent upon the inertia of the rotating parts of the compressor which are different for different centrifugal compressors but can be determined once the compressor has been constructed. The best efficiency line is also determined after the compressor has been constructed. FIG. 2 is representative of what would be considered typical deceleration and best efficiency curves. The x-axis of FIG. 2 can also represent time.

Referring to FIG. 2 point A is where the compressor is rotating at 100% of the maximum speed required to achieve maximum pressure ratio for exhausting bed 14. When the valves switch and the motor for the compressor is deenergized, the compressor decelerates along the deceleration curve until point B is reached where the deceleration curve intersects the best efficiency curve for the given compressor. At this point, the motor is reenergized and the speed of the compressor is increased along the best efficiency line by use of the variable frequency drive until 100% of the maximum speed is again reached which is point C on the curve. As shown in FIG. 2, the inlet pressure of the compressor is approximately 5 psia just prior to the valve switch, point A. Just after the switch, the compressor inlet pressure sees approximately 15 psia, or a pressure ratio of 1. The inlet pressure to the compressor decays due to the exhausting of the vessel by the decelerating masses of the compressor and motor. At point B, the compressor speed and pressure ratio will match along a best efficiency line where the VFD is re-energized. Operation between point B and C is done in a conventional manner by increasing the speed. At the point in time when bed 14 is to be desorbed, valves 22 and 28 will close and valves 20 and 30 will open and the cycle will be repeated.

Figure 3:
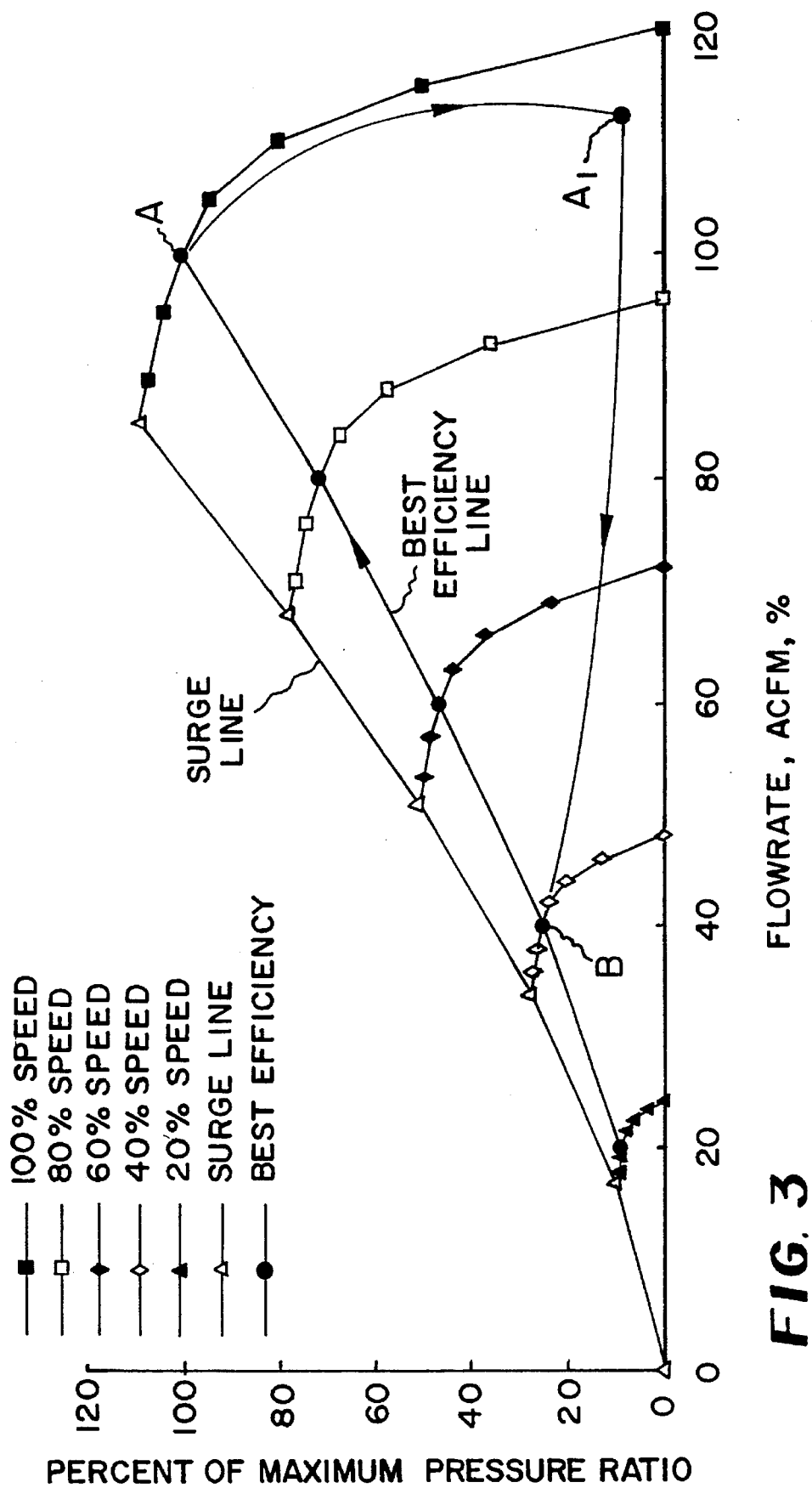
FIG. 3 is a plot of percent of pressure ratio (outlet to inlet across the compressor) against flow rate used to illustrate the method and apparatus of the invention.

An alternate way of illustrating the invention is shown in FIG. 3 wherein the cycle of the compressor 60 is shown in a plot of percent of pressure ratio plotted against flow rate in percent actual cubic feet per minute (%ACFM). As shown in FIG. 3, point A represents the full pressure ratio and full speed of the compressor just prior to switching of the inlet and exhaust valves on a given adsorption bed. At the time the valves switch, the energy to the motor is disengaged or minimized via the variable frequency drive. The compressor immediately sees a pressure ratio of about 1.0 at point $A_1$. At this point, the rotating parts of the compressor begin to decelerate due to the braking action of the gas in the compressor, deceleration proceeding with a decrease in flow rate along the line between points $A_1$ and B in FIG. 3. At the lower speed of the compressor and the lower pressure ratio at a point along the best efficiency line of the compressor, energy is added back to the motor and the speed of the compressor wheel is increased along the best efficiency line until point A is reached again. Point B is at a point below where a compressor surge would occur when the motor is reenergized.

Minimum speed of the compressor due to the braking action of the gas can be adjusted in 2 ways. The moment of inertia for the rotating parts can be raised or lowered to determine minimum speed or the variable frequency drive can be reengaged at a time interval that is shorter.

Having thus described our invention desired to be secured by Letters Patent of the United States is set forth in the appended claims.

What is claimed:

1. A method of cycling a centrifugal compressor, used as an exhauster in pressure swing or vacuum swing adsorption process, between full outlet to inlet pressure ratio and low outlet to inlet pressure ratio comprising the steps of:

installing a variable frequency drive unit to control a motor used to drive a compressor wheel of said centrifugal compressor, said variable frequency drive adjusted to match energy supplied to said motor for the speed of rotation required by said compressor wheel;

operating said compressor at a maximum speed of rotation required to maintain full pressure ratio for a predetermined time;

minimizing energy input to said motor to cause said compressor wheel to decelerate to a low point where said compressor wheel speed of rotation decreases to a point where the pressure ratio of the cycle matches the efficient compression ratio of the compressor; and re-energizing said motor and increasing speed of rotation of said compressor wheel according to the best efficiency plot for said compressor until said full pressure ratio is reached.

2. A method according to claim 1 wherein energy to said motor is minimized by continuously decreasing energy input to said motor to match deceleration of said compressor.

3. A method according to claim 1 wherein energy input to said motor is minimized by stopping energy input to said motor until said deceleration has reached its low point.

4. In a system for separating components of a gaseous feed stream by vacuum swing or pressure swing adsorption said system employing at least one vessel containing an adsorptive media said vessel alternately pressurized with an inlet compressor and depressurized by an exhauster the improvement comprising:

a centrifugal compressor disposed in an outlet of said vessel as an exhauster said compressor having a compressor wheel rotated by an electric motor controlled by a variable frequency drive unit;

first valve means to open and close an inlet conduit from said vessel to an inlet of said compressor, second valve means to open and close an outlet conduit from said vessel to said centrifugal compressor:

means to alternately open and close said first and second valve means; and wherein said compressor is adjusted to operate at a high speed required for a high outlet to inlet pressure ratio at a point in time just before a switch is made where said first valve means is closed and said second valve means is opened to exhaust said vessel and after said switch is made energy to said motor is minimized to a permit deceleration of said compressor wheel until speed of rotation of said compressor wheel decreases to a level where the pressure ratio between the outlet and inlet matches the efficient compression ratio of the compressor and said energy to said compressor is increased until said compressor wheel is rotating at said high speed.

5. A system according to claim 1 including means to stop energy input to said motor when said first valve means is closed and said second valve means is opened.

6. A system according to claim 1 including means to match electrical frequency to said motor to said deceleration speed.

7. A method for evacuating adsorbed gases from an adsorbent containing vessel used to separate components from a gaseous mixture by pressure swing or vacuum swing adsorption comprising the steps of:

installing a variable frequency drive controlled electrically motor driven centrifugal compressor having a compressor wheel on a valved conduit used to evacuate said vessel;

closing said valve on said conduit during a period of time that gaseous mixture is admitted to said vessel for separation;

operating said compressor at a speed of rotation of the compressor wheel to maintain full outlet to inlet pressure ratio across said compressor;

stopping admission of said gaseous mixture to said vessel while simultaneously opening said valve in said conduit and minimizing energy to said compressor so that the speed of rotation of said compressor wheel decreases due to adsorbed gaseous components being exhausted from said vessel;

permitting said compressor wheel to decelerate until said speed of rotation of said compressor wheel decreases to a point where the pressure ratio across said compressor wheel matches the efficient compression ratio of the compressor; and re-energizing said motor and increasing speed of rotation of said compressor wheel according to the best efficiency curve for said compressor until said full outlet to inlet pressure ratio across said compressor is reached.

8. A method according to claim 7 wherein said compressor is used to alternately evacuate at least two pressure vessels operated as switching adsorbers.

9. A method according to claim 7 wherein energy to said motor is continuously decreased to match deceleration of said compressor.

10. A method according to claim 7 wherein energy to said motor is terminated for a period of time from opening of said valve until said pressure ratio across said compressor matches the efficient compression ratio of the compressor.

* * * * *